US011675100B2

(12) United States Patent
Pattnaik et al.

(10) Patent No.: US 11,675,100 B2
(45) Date of Patent: Jun. 13, 2023

(54) MITIGATION OF FIBER OPTIC CABLE COUPLING FOR DISTRIBUTED ACOUSTIC SENSING

(71) Applicant: HALLIBURTON ENERGY SERVICES, INC., Houston, TX (US)

(72) Inventors: Sonali Pattnaik, Houston, TX (US); Mark Elliott Willis, Katy, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 0 days.

(21) Appl. No.: 17/133,409

(22) Filed: Dec. 23, 2020

(65) Prior Publication Data

US 2022/0196861 A1  Jun. 23, 2022

(51) Int. Cl.
*G01V 1/28* (2006.01)
*G01V 1/36* (2006.01)

(52) U.S. Cl.
CPC .............. *G01V 1/282* (2013.01); *G01V 1/364* (2013.01); *G01V 2210/32* (2013.01)

(58) Field of Classification Search
None
See application file for complete search history.

(56) References Cited

U.S. PATENT DOCUMENTS

| 2018/0373961 A1* | 12/2018 | Wang | G06V 30/422 |
| 2020/0103544 A1 | 4/2020 | Padhi et al. | |
| 2020/0132872 A1 | 4/2020 | Dossary et al. | |
| 2020/0174149 A1* | 6/2020 | Thiruvenkatanathan | E21B 47/14 |
| 2020/0183035 A1 | 6/2020 | Liu et al. | |
| 2020/0202548 A1* | 6/2020 | Wang | G06K 9/6228 |
| 2020/0284937 A1* | 9/2020 | Zhang | G01V 1/50 |
| 2021/0063594 A1* | 3/2021 | Wang | G06N 3/084 |
| 2021/0150283 A1* | 5/2021 | Li | G06N 3/08 |

FOREIGN PATENT DOCUMENTS

| CN | 109902806 A * | 6/2019 |
| WO | 2020150223 A1 | 7/2020 |

OTHER PUBLICATIONS

Francis H.M. Jones and D.W. Oldenburg, First Examination of the Data, University of British Columbia, Department of Earth and Ocean Sciences (Year: 2002).*
Ping Lu, Deep Learning Realm for Geophysics: Seismic Acquisition, Processing, Interpretation, and Inversion (Year: 2019).*

(Continued)

*Primary Examiner* — Lina M Cordero
(74) *Attorney, Agent, or Firm* — Novak Druce Carroll LLP

(57) ABSTRACT

The disclosed technology provides solutions for identifying noise in seismic profile data sets. In some aspects, a process of the disclosed technology includes steps for receiving wellbore data including seismic measurements, processing the wellbore data to generate a seismic input image including visual representations of the one or more seismic measurements, and processing the seismic input image to identify a noise region in the seismic input image. Systems and machine-readable media are also provided.

20 Claims, 11 Drawing Sheets

(56) References Cited

OTHER PUBLICATIONS

Willis, M.E., Wu, X., Palacios, W. and Ellmauthaler, A., 2019. Understanding cable coupling artifacts in wireline-deployed DAS VSP data. In SEG Technical Program Expanded Abstracts 2019 (pp. 5310-5314). Society of Exploration Geophysicists.

Howard, A.G., Zhu, M., Chen, B., Kalenichenko, D., Wang, W., Weyand, T., Andreetto, M. and Adam, H., 2017. Mobilenets: Efficient convolutional neural networks for mobile vision applications. arXiv preprint arXiv:1704.04861.

Liu, W., Anguelov, D., Erhan, D., Szegedy, C., Reed, S., Fu, C.Y. and Berg, A.C., Oct. 2016. SSD: Single shot multibox detector. In European conference on computer vision (pp. 21-37). Springer, Cham.

Yu, G., Cai, Z, Chen, Y., Wang, X., Zhang, Q., Li, Y., Wang, Y., Liu, C., Zhao, B., and Greer, J., 2016, Walkaway VSP using multimode optical fibers in a hybrid wireline, The Leading Edge July. https://doi.org/10.1190/tle35070615.1.

Chen, J., W. Chen, X. Wang, Y. Zhou, Z. Shi, 2018a, DAS coupling noise suppression using wavelet and DCT dictionary based on sparse optimization, SEG Annual Meeting DOI 10.1190/segam2018-2996038.1.

Dictionary: Kiauder wavelet, SEGwiki, https://wiki.seg.org/wiki/Dictionary:Klauder_wavelet.

Dictionary: Ricker wavelet, SEGwiki, https://wiki.seg.org/wiki/Dictionary:Ricker_wavelet.

Willis, M.E., Palacios, P.W., Zhoa, X., 2019, Zigzag noise mitigation of fiber optic cable coupling in DAS VSP data.

International Search Report and Written Opinion for PCT Application No. PCT/US2021/060334 dated Mar. 11, 2022, 10 pages.

\* cited by examiner

MITIGATION OF FIBER OPTIC CABLE COUPLING FOR DISTRIBUTED ACOUSTIC SENSING

TECHNICAL FIELD

The present disclosure relates to the analysis of seismic profile data sets and in particular, to the use of image analysis techniques, including the use of machine-learning, to isolate noise within fiber optic distributed acoustic sensing datasets.

BACKGROUND

Fiber-optic sensors are increasingly used in wellbore operations, for example, to facilitate sensing some quantity, typically temperature or mechanical strain, but sometimes also displacements, vibrations, pressure, acceleration, rotations, or concentrations of chemical species. The general principle of such devices is that light from a laser is sent through an optical fiber and after experiencing some changes of its parameters, either in the fiber or in one or several fiber Bragg gratings, then reaches a detector arrangement which measures these changes.

In particular, a growing application field is the use of fiber optic sensing system for acoustic sensing, especially Distributed Acoustic Sensing (DAS). DAS is quickly becoming recognized as a powerful tool for remote downhole sensing. The list of existing and potential applications for this new technology is long and continues to grow.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
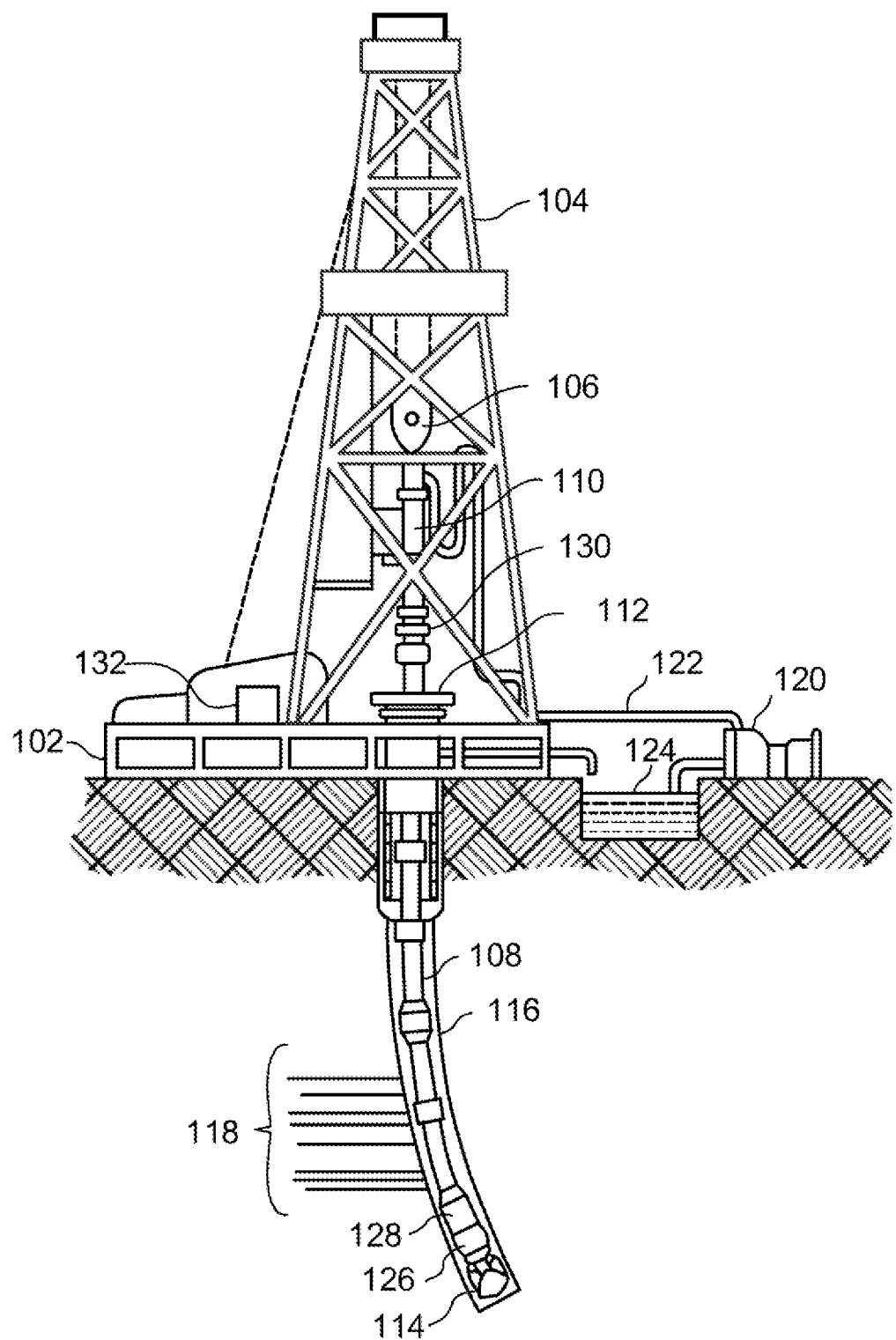
FIG. 1A is a schematic side-view of a wireline logging environment.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Vertical seismic profiling (VSP) is a measurement technique used for seismic monitoring of a geologic formation. There are different types of VSP with most sharing the characteristic that a seismic sensor system is disposed in a wellbore. A distributed acoustic sensing (DAS) system is one type of seismic sensor system utilized for VSP. The DAS system utilizes downhole distributed acoustic sensors, such as optical fibers, as sensing elements to detect seismic waves incident on the distributed acoustic sensor resulting from an acoustic source outputting acoustic energy at or near the surface of the wellbore. The DAS system typically utilizes Rayleigh backscattered of laser light energy to spatially detect deformation (often referred to as strains) distributed along the optical fibers. The backscattered light is processed to determine light phase differences caused by the strains and changes in the strain along the optical fiber which in turn is translated to measurements of seismic waves incident on the distributed acoustic sensor at different depths in the wellbore. Depending on the implementation, the seismic data (or wellbore data) can be used to determine rock properties in the geologic formation, such as where hydrocarbons are present in the formation.

First breaks are seismic waves initially incident on optical fiber associated with a distributed acoustic sensing (DAS) system located downhole in a wellbore of a geologic formation. In some examples, these first breaks produce resonant noise in the seismic/wellbore data such as a ringing or zigzag noise. The resonant noise may be due to reverberation of the optical fiber downhole resulting from seismic waves incident on the optical fiber, among other reasons. For example, if the deployed cable is hanging freely between two points touching the wellbore wall, a high-amplitude noise can result. This resonant noise can reverberate up and down the cable, between the fixed points, and can also propagate along the cable at variable speeds. In particular, for cables with long gauge lengths, the noise can be more greatly spatially smeared, affecting a greater number of channels, and thereby masking more of the seismic data associated with rock properties in the formation.

The disclosed technology addresses some of the foregoing problems in performing wellbore data collection by providing solutions for identifying/isolating noise in acquired seismic data (e.g., VSP data). Subsequently, noise reduction/elimination techniques can be applied to eliminate the noise, thereby making the seismic data more reliable and interpretable. The noise identification/isolation techniques disclosed herein can make use of image processing performed on image renderings of collected seismic data (e.g., fiber VSP data) to identify visual features corresponding with noise regions, patterns, and/or other noise artifacts.

In some aspects, the disclosed image analysis techniques are utilized to isolate noise by employing machine-learning (ML) techniques, such as the use of convolutional neural networks and/or deep-learning approaches. However, it is understood that the ML architectures and applications described herein are provided for explanatory purposes, and are not intended to be limiting in scope. As such, those of skill in the art will recognize that other image processing and/or ML techniques can be implemented, without departing from the scope of the disclosed technology.

By way of example, machine-learning models can also be based on clustering algorithms (e.g., a Mini-batch K-means clustering algorithm), or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

The disclosure now turns to FIG. 1A, which illustrates an example logging while drilling (LWD) environment. A drilling platform 102 supports derrick 104 having traveling block 106 for raising and lowering drill string 108. Kelly 110 supports drill string 108 as it is lowered through rotary table 112. Drill bit 114 is driven by a downhole motor and/or rotation of drill string 108. As drill bit 114 rotates, it drills a borehole 116 that passes through various formations 118. Pump 120 circulates drilling fluid through a feed pipe 122 to kelly 110, downhole through the interior of drill string 108, through orifices in drill bit 114, back to the surface via the annulus around drill string 108, and into retention pit 124. The drilling fluid transports cuttings from the borehole into pit 124 and aids in maintaining borehole integrity.

Downhole tool 126 can take the form of a drill collar (i.e., a thick-walled tubular that provides weight and rigidity to aid the drilling process) or other arrangements known in the art. Further, downhole tool 126 can include acoustic (e.g., sonic, ultrasonic, etc.) logging tools and/or corresponding components, integrated into the bottom-hole assembly near drill bit 114. In this fashion, as drill bit 114 extends the borehole through formations, the bottom-hole assembly (e.g., the acoustic logging tool) can collect acoustic logging data. For example, acoustic logging tools can include transmitters (e.g., monopole, dipole, quadrupole, etc.) to generate and transmit acoustic signals/waves into the borehole environment. These acoustic signals subsequently propagate in and along the borehole and surrounding formation and create acoustic signal responses or waveforms, which are received/recorded by evenly spaced receivers. These receivers may be arranged in an array and may be evenly spaced apart to facilitate capturing and processing acoustic response signals at specific intervals. The acoustic response signals are further analyzed to determine borehole and adjacent formation properties and/or characteristics. Depending on the implementation, other logging tools may be deployed. For example, logging tools configured to measure electric, nuclear, gamma and/or magnetism levels may be used. Logging tools can also be implemented to measure pressure, temperature, perform fluid identification and/or measure tool orientation, etc.

For purposes of communication, a downhole telemetry sub 128 can be included in the bottom-hole assembly to transfer measurement data to surface receiver 130 and to receive commands from the surface. Mud pulse telemetry is one common telemetry technique for transferring tool measurements to surface receivers and receiving commands from the surface, but other telemetry techniques can also be used, including fiber optic telemetry, electric telemetry, acoustic telemetry through the pipe, electromagnetic (EM) telemetry, etc. In some embodiments, telemetry sub 128 can store logging data for later retrieval at the surface when the logging assembly is recovered.

At the surface, surface receiver 130 can receive the uplink signal from the downhole telemetry sub 128 and can communicate the signal to data acquisition module 132. Module 132 can include one or more processors, storage mediums, input devices, output devices, software, and the like as described in detail with respect to FIG. 7, below. Module 132 can collect, store, and/or process the data received from tool 126 as described herein.

Figure 1B:
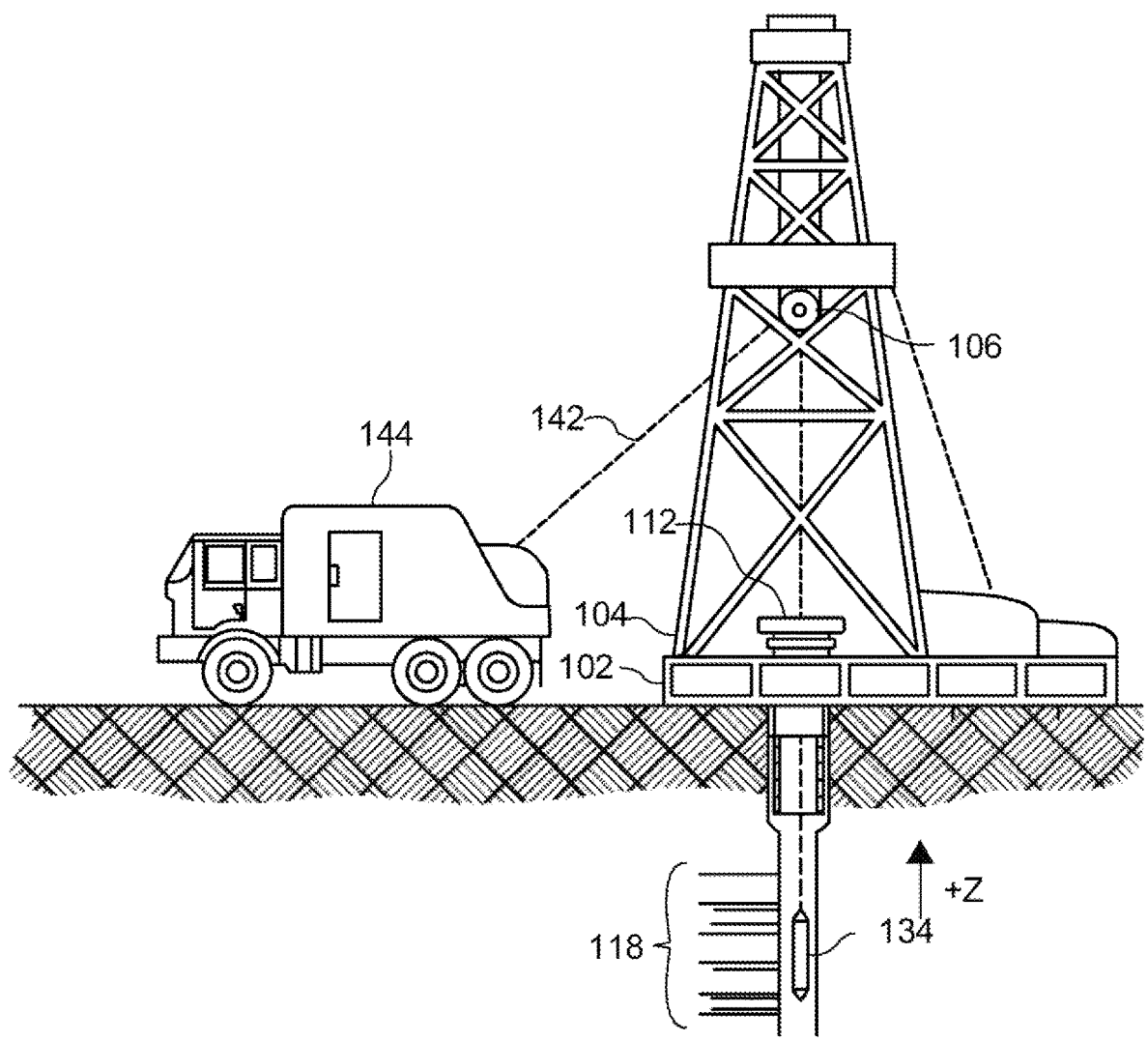
FIG. 1B is a schematic side-view of the logging environment of FIG. 1A.

At various times during the process of drilling a well, drill string 108 may be removed from the borehole as shown in FIG. 1B. Once drill string 108 has been removed, logging operations can be conducted using a downhole tool 134 (i.e., a sensing instrument sonde) suspended by a conveyance 142. In one or more embodiments, conveyance 42 can be a cable having conductors for transporting power to the tool and telemetry from the tool to the surface. Downhole tool 134 may have pads and/or centralizing springs to maintain the tool near the central axis of the borehole or to bias the tool towards the borehole wall as the tool is moved downhole or uphole.

Downhole tool 134 can include an acoustic or sonic logging instrument that collects acoustic logging data within the borehole 116. As mentioned above, other logging instruments may also be used. A logging facility 144 includes a computer system, such as those described with reference to FIG. 7, for collecting, storing, and/or processing the data/measurements gathered by logging tool 134. In one or more embodiments, the conveyance 142 of the downhole tool 134 may be at least one of wires, conductive or non-conductive cable (e.g., slickline, etc.), as well as tubular conveyances, such as coiled tubing, pipe string, or downhole tractor. Downhole tool 134 can have a local power supply, such as batteries and/or a downhole generator, or the like. When employing non-conductive cable, coiled tubing, pipe string, or downhole tractor, communication can be supported using, for example, wireless protocols (e.g. EM, acoustic, etc.), and/or measurements and logging data may be stored in local memory for subsequent retrieval. In some aspects, electric or optical telemetry is provided using conductive cables and/or fiber optic signal-paths.

Although FIGS. 1A and 1B depict specific borehole configurations, it is understood that the present disclosure is suited for use in wellbores having other orientations including vertical wellbores, horizontal wellbores, slanted wellbores, multilateral wellbores and the like. While FIGS. 1A and 1B depict an onshore operation, it should also be understood that the present disclosure is equally well suited for use in offshore operations. Moreover, the present disclosure is not limited to the environments depicted in FIGS. 1A and 1B, and can also be used, for example, in other well operations such as production tubing operations, jointed tubing operations, coiled tubing operations, combinations thereof, and the like.

Figure 2:
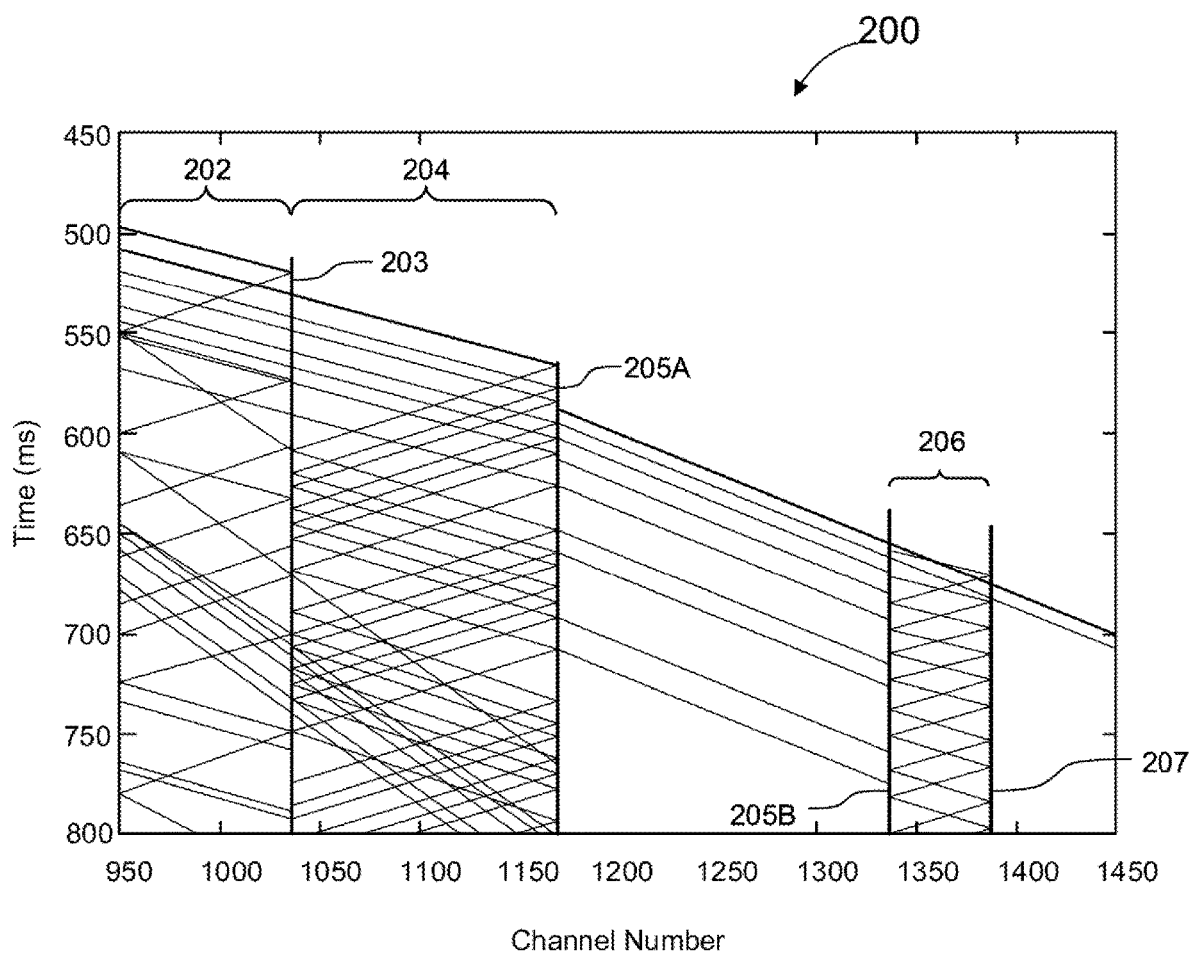
FIG. 2 illustrates an example of a seismic image for a vertical seismic profile (VSP) dataset acquired using fiber optic distributed sensing (DAS), according to some aspects of the disclosed technology.

FIG. 2 illustrates an example of a seismic image 200 for a vertical seismic profile (VSP) dataset acquired using fiber optic distributed sensing (DAS). As illustrated, seismic image 200 includes several image regions corresponding with noise artifacts, e.g., noise regions 202, 204, and 206. Notably, each of noisy regions 202, 204, 206 have various dimensions (aspect ratios), and can be seen occurring at different wellbore depths, e.g., as indicated by the corresponding channel number. Also apparent in seismic image 200 are boundaries between noisy regions, such as boundary 203 between regions 202 and 204, and boundary 205A separating region 204 from a relatively noise-free portion of seismic image 200, spanning from approximately channel number 1160 to 1340. Again, boundaries are seen defining noisy region 206 at a lower boundary, e.g., at approximately channel number 1340 (boundary 205B), and at an upper boundary, e.g., at approximately channel number 1390 (boundary 207).

Notably, each of regions 202, 204, 206, define regions of image 200 corresponding to noise data that may be desired to be eliminated from the dataset. In practice, regions 202, 204, 206 can be identified using image processing techniques. As disclosed in further detail below, the identification of each of regions 202, 204, 206 can be indicated using polygons of matching aspect ratios, e.g., that can be superimposed onto image 200, or for which polygon data can be used to identify image coordinates (e.g., channel number, time), where various noise artifacts are present.

In some implementations, seismic images, such as image 200, may be provided as an input image (e.g., a seismic input image) to a machine-learning (ML) network that is configured to perform object detection and classification, e.g., to identify one or more noisy areas (containing zigzag noise) within a seismic input image. For example, object detection can be performed using a deep learning technique that performs object identification and localization for multiple object classes in a provided input image. Depending on the desired implementation, object detection can be performed either by creating a bounding box around the object, and classifying the object to a category, or by classifying images at the pixel level (segmentation). By way of example, a Single Shot multi-box Detector (SSD) network can be used, for example that is configured to predict the bounding box and the class in a "single shot" as image processing is performed. However, it is understood that various machine-learning approaches, including but not limited to the use of other network architectures, can be used depending on the desired implementation, without departing from the scope of the disclosed technology.

Figure 3A:
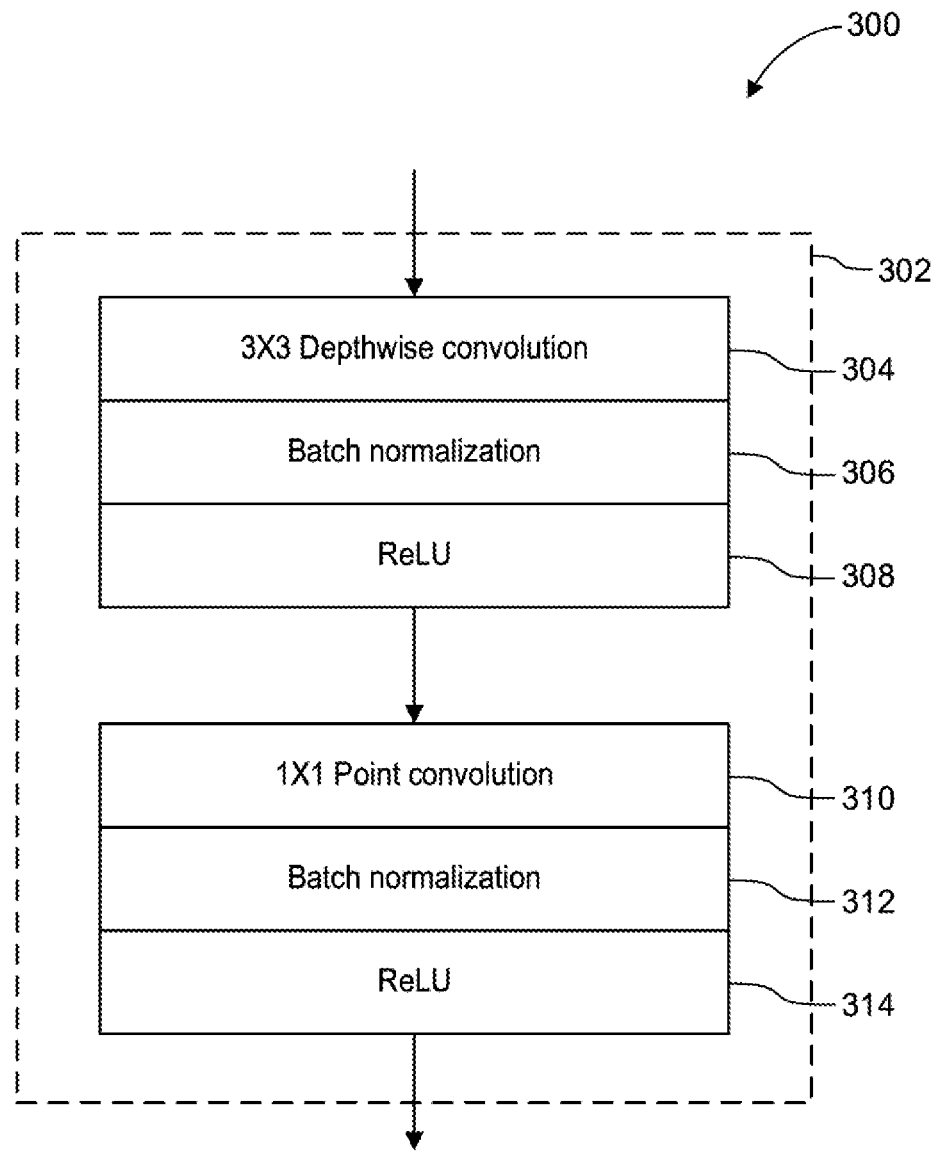
FIG. 3A illustrates a block diagram of a base network that can be deployed in conjunction with a feed-forward convolutional network to facilitate a noise isolation process, according to some aspects of the disclosed technology.

FIG. 3A illustrates a block diagram of a base network (e.g., MobileNet 300) that can be deployed to facilitate a noise isolation process of the disclosed technology. In some aspects, base networks, such as MobileNet 300, can be implemented as a light-weight processing solution, e.g., where processing resources are limited. In such implementations, some fully connected network layers may be discarded. In such approaches, MobileNet 300 provides a light-weight deep neural network based on depthwise separable convolutions that helps achieve strong performance on image classification tasks. In case of MobileNet 300, first there is a depthwise (3×3) convolutional layer 302 that filters the input, followed by a pointwise (1×1) convolutional layer 310 that takes the filtered output values to create new features. As illustrated, depthwise convolutional layer 302 is associated with batch normalization block 306 and a rectifier linear unit (ReLU 308). Similarly, pointwise convolutional layer 310 is associated with batch normalization block 312, and a rectifier linear unit (ReLU 314).

Figure 3B:
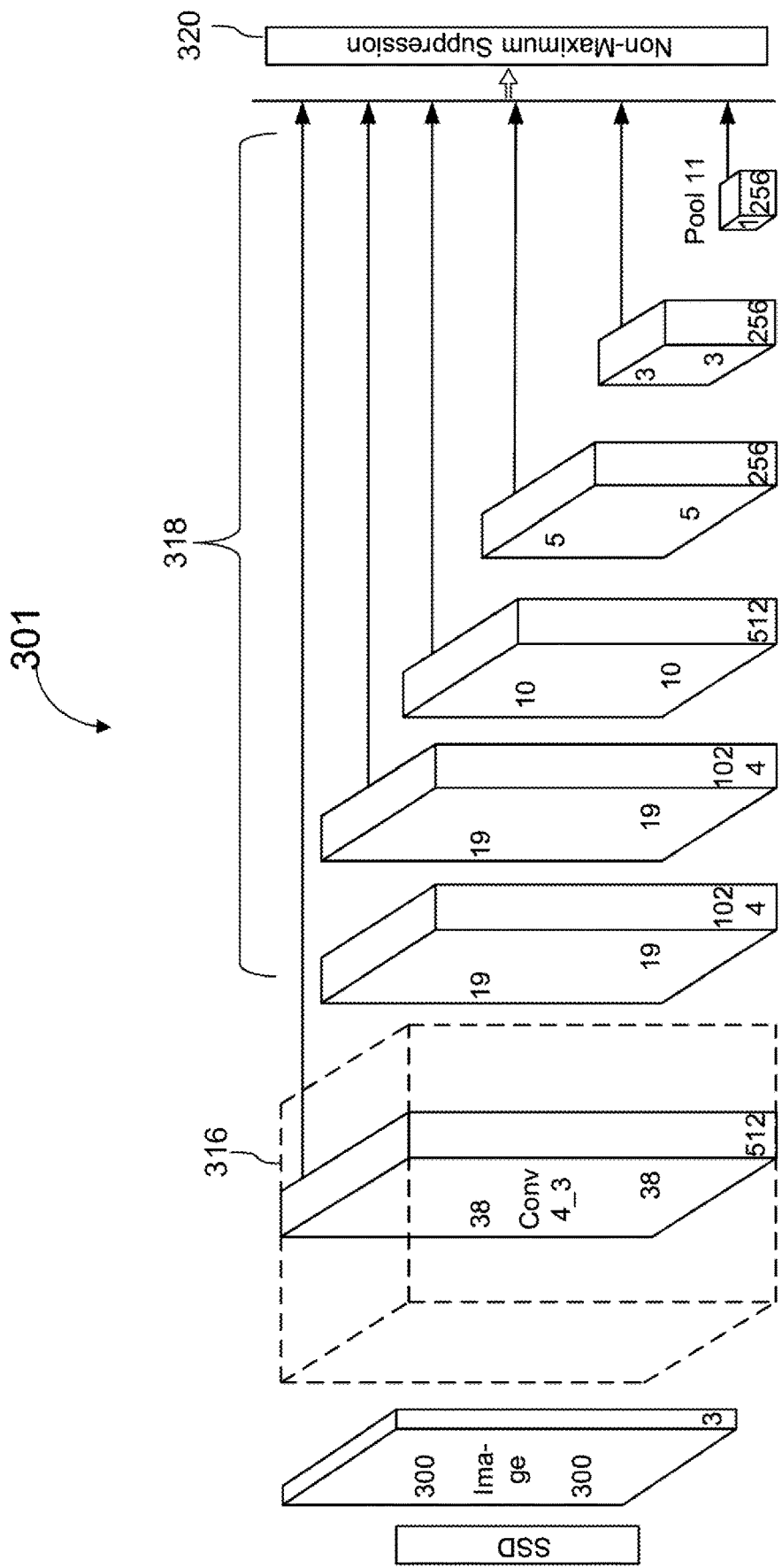
FIG. 3B conceptually illustrates an example architecture of a single-shot detector network that can be used to facilitate a noise isolation process, according to some aspects of the disclosed technology.

In some aspects, a base network, such as MobileNet 300, may be deployed as part of a deep-learning architecture, for example, that includes additional feature layers, as depicted in FIG. 3B.

In particular, FIG. 3B conceptually illustrates an example architecture of a single-shot detector (SSD) 301 neural network that can be used to facilitate a noise isolation process. In the example of FIG. 3B, base layer 316 can be truncated (as compared to MobileNet 300 of FIG. 3A) where instead of the fully connected layers in the end, a set of additional convolutional layers (318) are added. These auxiliary convolutional layers 318 decrease in size progressively and allow for feature extraction and object prediction to be done at multiple scales. By removing the fully connected layers and adding convolutional layers 318 at the end, network 301 can accept images of different dimensions. For each location in each of these feature maps, a 3×3 convolutional filter can be used to evaluate class probabilities and an offset relative to the default bounding box coordinates. The class probabilities are the prediction scores that indicate the presence of an object in each corresponding box.

In some aspects, the machine-learning model (e.g., SSD 301) can be trained using a dataset comprising input images with corresponding ground-truth bounding box (or pixel segmentation) labels. In such instances, the ML training procedure may by designed to minimize a loss function that is given by equation (1):

$$IOU = (\text{Area of Overlap})/(\text{Area of Union}) \quad (1)$$

wherein a predicted bounding box is labeled as positive (e.g., correctly classified) when the calculated IOU score is greater than 0.50. In some aspects, a large number of bounding boxes can be generated (at multiple scales). In such aspects, SSD can be configured to use non-maximum suppression (320) to group highly overlapping bounding boxes into a single box that has the highest IOU and to discard the remaining bounding boxes. In some aspects, SSD can also be configured to use hard-negative mining, for example, to balance the large number of negative boxes generated by using only a subset of negative examples with the highest training loss at each iteration.

Figure 4:
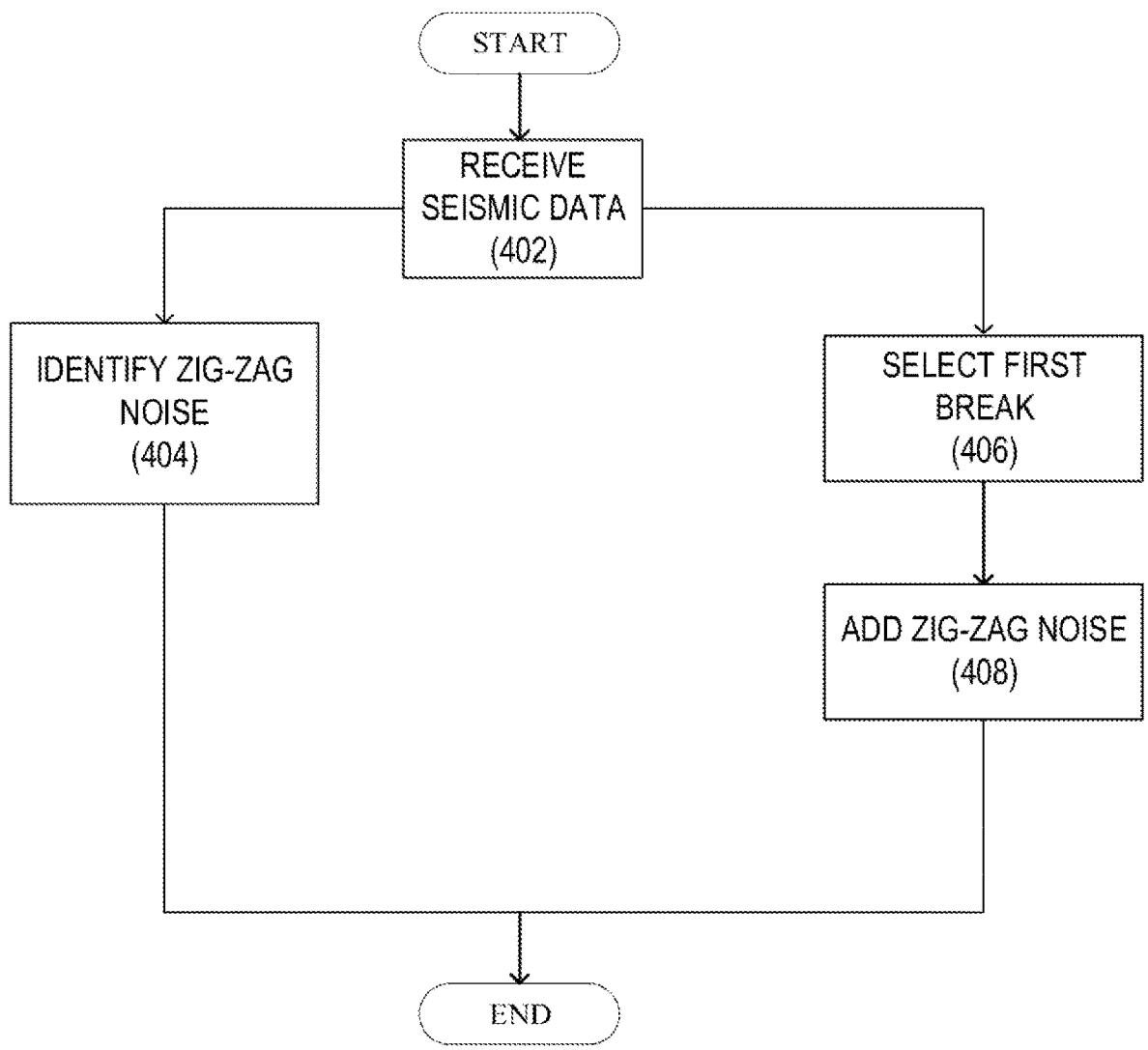
FIG. 4 illustrates an example process for generating synthetic seismic records, according to some aspects of the disclosed technology.

FIG. 4 illustrates an example process 400 for generating synthetic seismic records containing zigzag noise, according to some aspects of the disclosed technology. Process 400 begins with step 402 in which seismic data is received. Depending on the implementation, the seismic data may be (or may be based on) collected field data. Alternatively, the seismic data may be synthetically generated, for example, using a velocity model or other modeling technique, such as by using a full elastic/acoustic seismic modeling process. In some implementations, for example where the seismic data is synthetically generated, random noise may be added to the seismic data, to increase data variance to improve the quality of the seismic data for use in an ML training process, as discussed in further detail below.

In step 404, where the received seismic data is field data comprising zigzag noise, the zigzag noise is identified. For example, zigzag noise identification can be performed by identifying image coordinates (e.g., time, depth) indicating where the zigzag noise is present. Alternatively, process 400 proceeds to step 406, where the seismic data comprises field data or synthetic data without pre-existing zigzag noise. In step 406, a first break is selected. The selected first break can be used to determine where zigzag noise is added to the synthetic data (step 408). In some aspects, parameters (e.g., velocity and/or width parameters) for the added (synthetic)

zigzag noise may be varied to more closely simulate zigzag noise that is typically detected in field data.

Figure 5A:
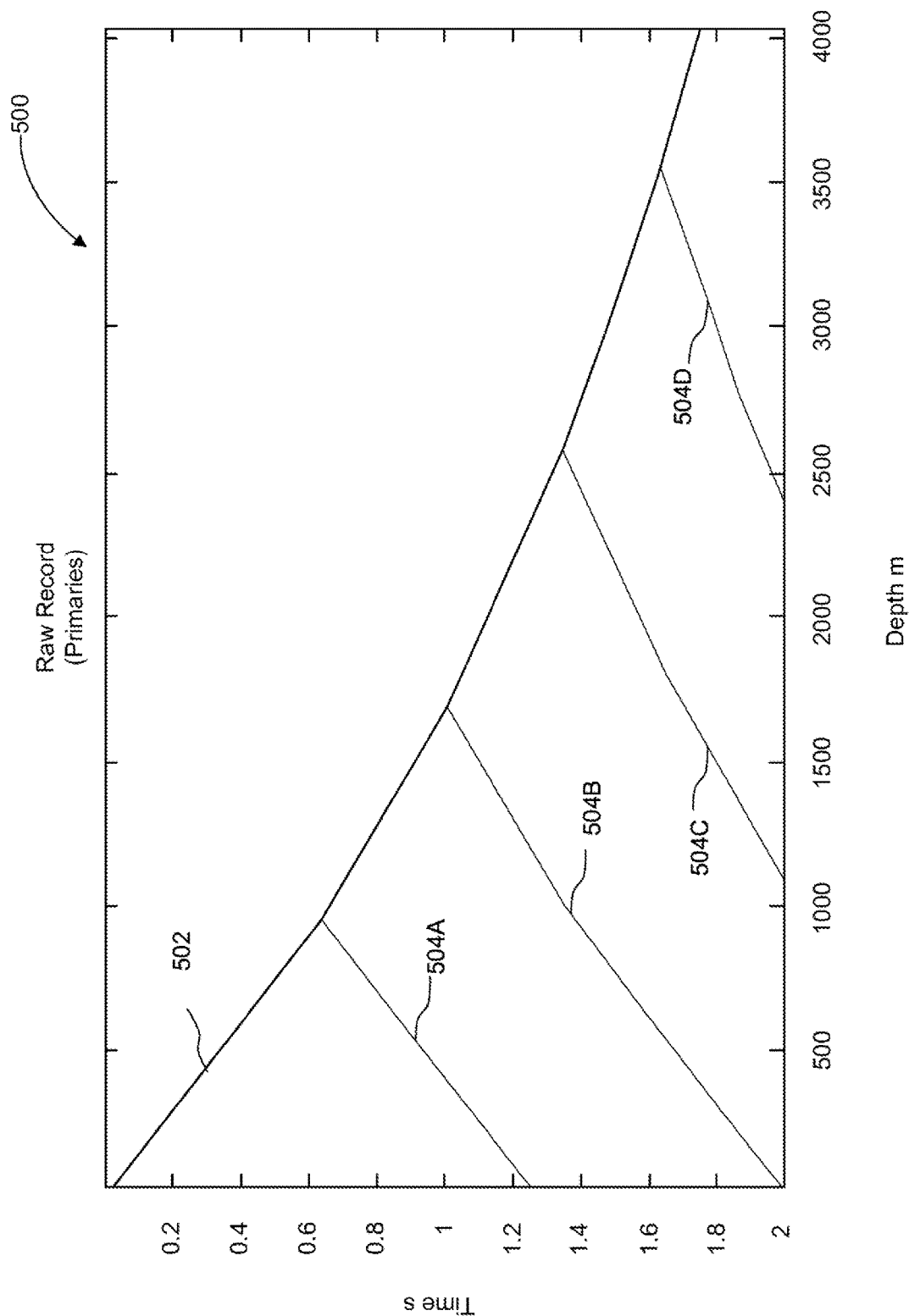
FIGS. 5A, 5B, and 5C illustrate examples of synthetic records that can result from a data generation process, such as the process of FIG. 4, according to some aspects of the disclosed technology.
Figure 5B:
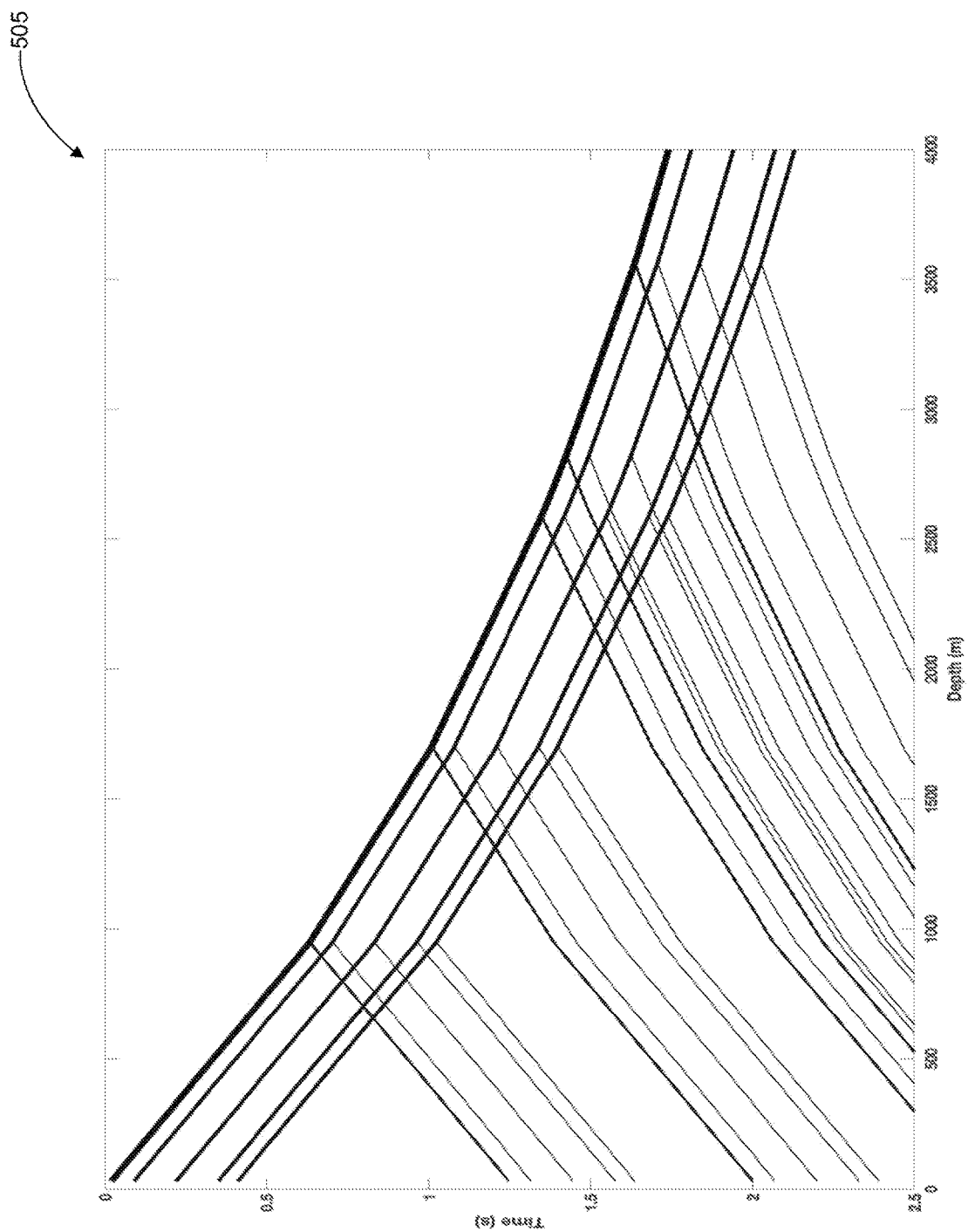
Figure 5C:
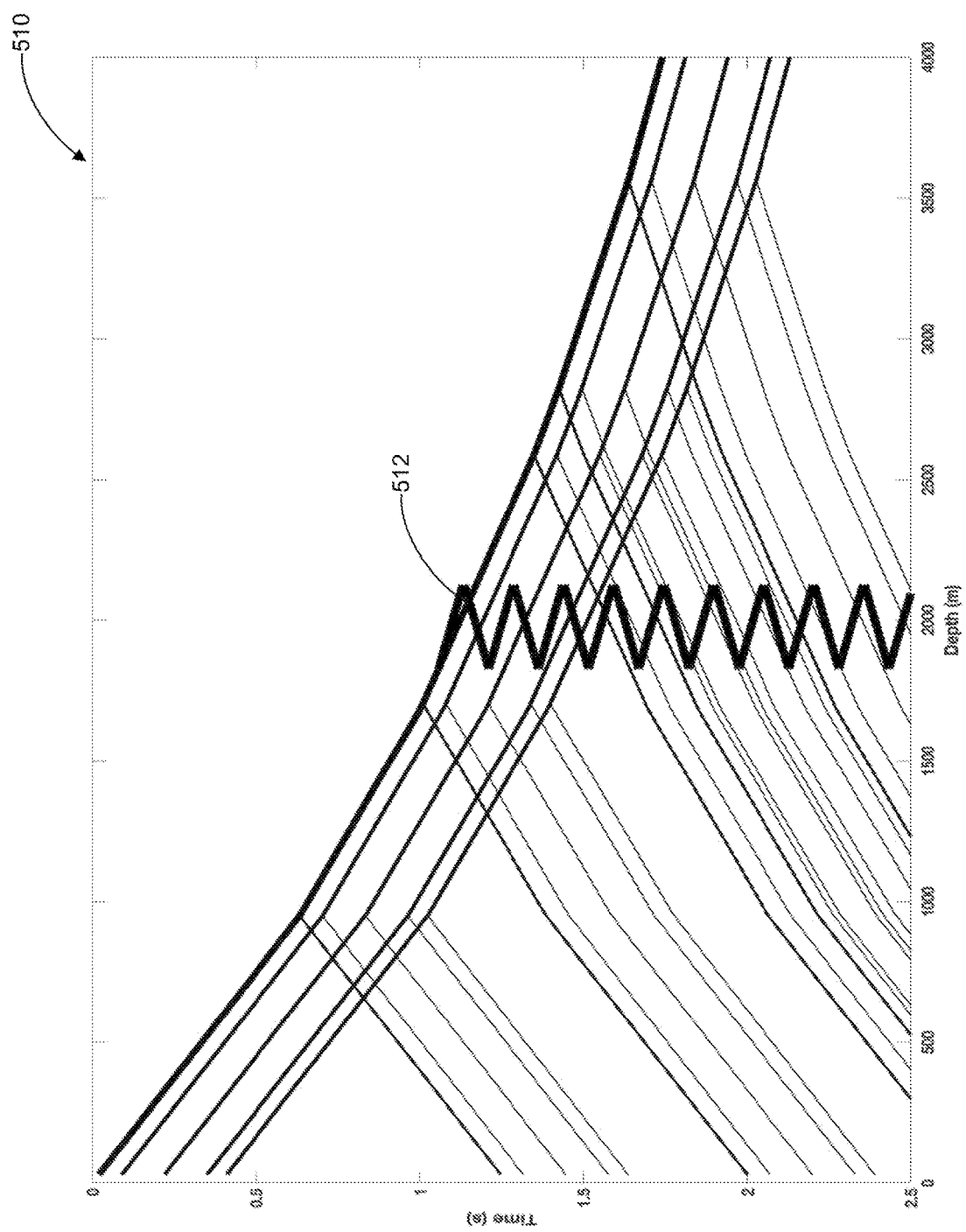

FIGS. 5A, 5B, and 5C illustrate examples of seismic data records that can be used to facilitate the training of an ML model, for example, to facilitate a noise isolation process of the disclosed technology. In particular, FIG. 5A illustrates an example of a synthetic seismic image (VSP record) 500 including a source wavelet (e.g., a Klauder wavelet) 502 to which simulated zigzag noise can be added, e.g., to generate synthetic data for ML training. In the example of FIG. 5A a random number of primary reflections (up-going multiples) 504 (e.g., 504A, 504B, 504C, and 504D) were created to simulate multiple bounces of the seismic energy in the subsurface. In some approaches, for example, wherein the synthetic seismic record is created from a velocity model, this can be accomplished by creating a trace with multiple spikes, separated in time by random time shifts, and random amplitudes. By convolving the spike with each trace, multiples of the record can be generated. For each example training record, the process can be repeated, producing a multiples record 505, as exemplified in FIG. 5B. Subsequently, zigzag noise can be added to each record e.g., to simulate the noise characteristic in real seismic field data, as depicted in FIG. 5C which depicts a multiples record with noise added 510.

In particular, FIG. 5C illustrates an example of synthetic zigzag noise 512 that has been added to a seismic record. In some aspects, the added zigzag noise 512 can be generated using randomly generated parameters e.g., for width and/or depth. Additionally, velocity parameters can be varied such that velocities for zig and zag portions of the added noise component are not identical.

Figure 6:
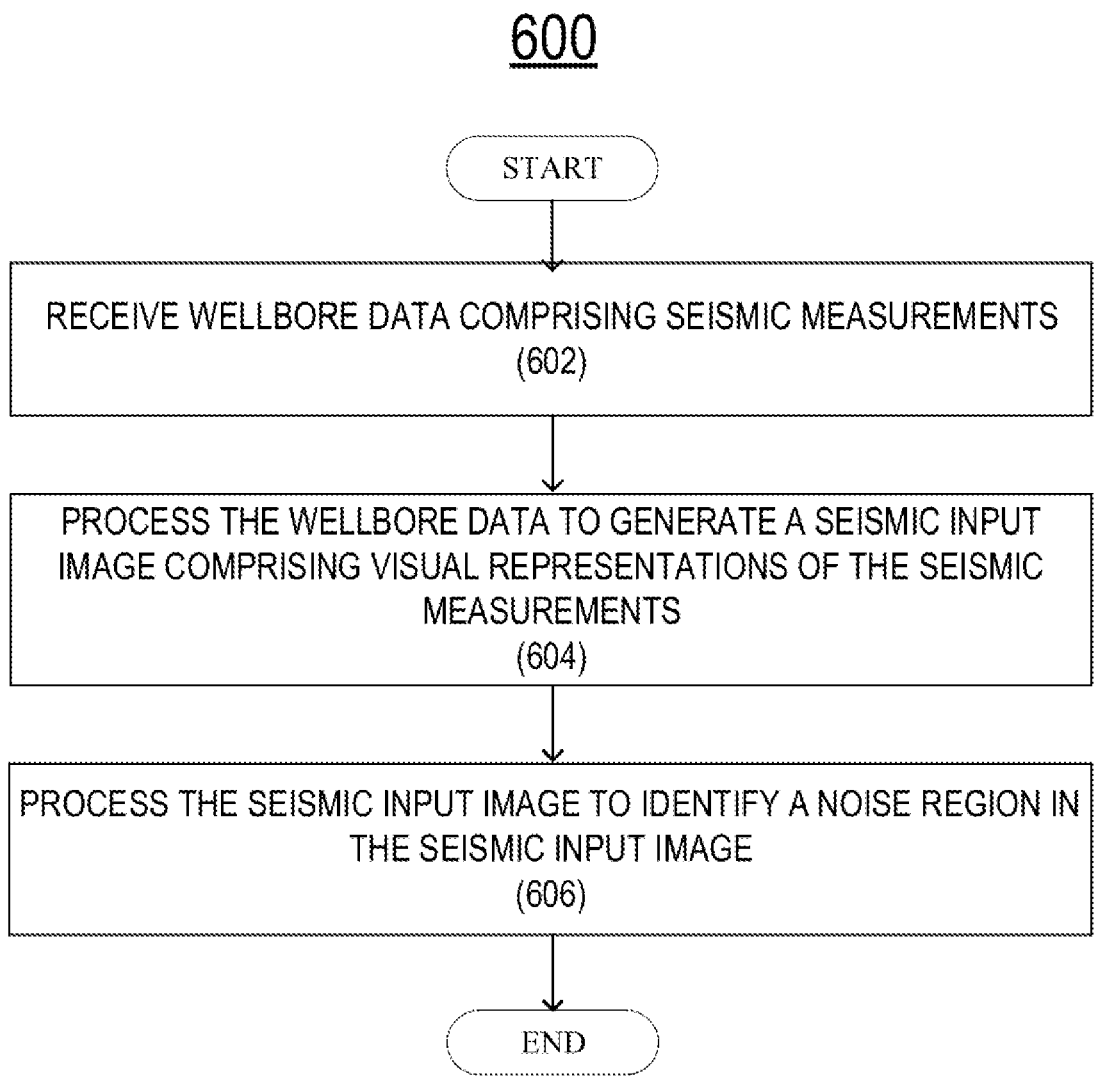
FIG. 6 illustrates steps of an example process for isolating noise in seismic measurement data, according to some aspects of the disclosed technology.

FIG. 6 illustrates steps of an example process 600 for isolating noise in seismic measurement data, according to some aspects of the disclosed technology. Process 600 begins with step 602 in which wellbore data is received/collated that includes seismic measurement data. As discussed above, the seismic measurement data can include vertical seismic profiling (VSP) data that is received from a distributed acoustic sensing (DAS) system.

In step 604, the wellbore data is processed to generate a seismic input image comprising visual representations of the seismic measurements (e.g., seismic waves). As discussed above in relation to FIG. 2, the seismic input image can include one or more noise regions that are observable as image artifacts, such as noise regions 202, 204, 206.

In step 606, the seismic input image is process to identify at least one noise region in the input image. As discussed above, the performed image processing can include the use of one or more machine-learning techniques, such as the use of a Single Shot Detector (SSD) convolutional neural network. In such implementations, regions in the seismic input image corresponding with noisy seismic data can be identified by bounded polygons or bounding boxes. Alternatively, the noisy regions may be identified as pixel coordinates, for example, in a pixelwise segmentation approach. Once the locations of noise within the image space have been identified, the seismic images and noise component coordinate information can be provided to one or more additional processes configured to perform noise attenuation and/or elimination.

Figure 7:
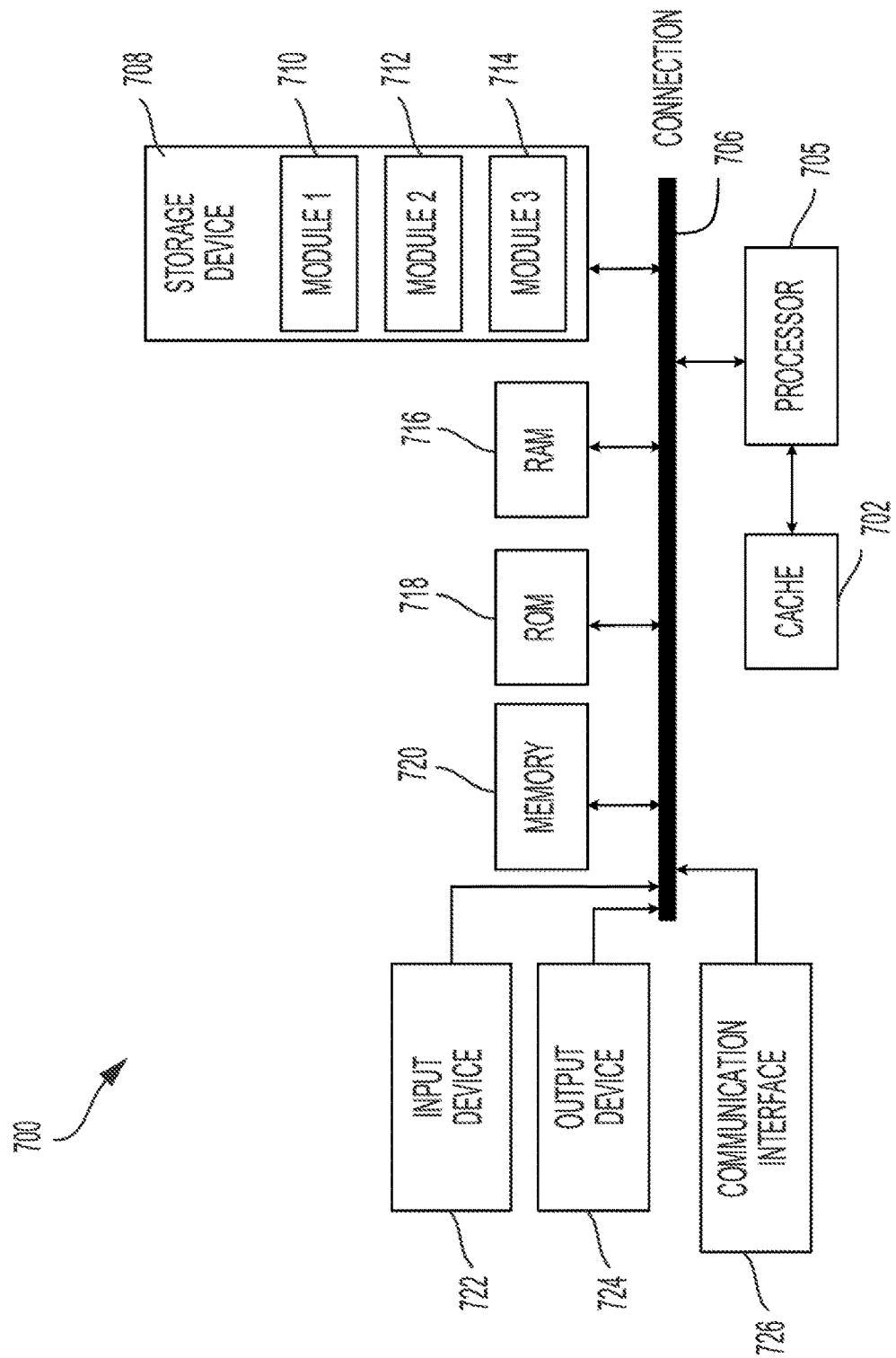
FIG. 7 illustrates a computing device that can be used to implement some aspects of the disclosed technology.

FIG. 7 is a schematic diagram of an example system embodiment. Depending on implementation, system architecture 700 could be implemented at the surface or downhole. Additionally, it is understood that the architecture of system 700 could be implemented in both surface and downhole hardware, depending on the desired implementation. In the example of system architecture 700, components of the system are in electrical communication with each other using bus 706. System architecture 700 can include a processing unit (CPU or processor) 705, as well as a cache 702, that are variously coupled to system bus 706. Bus 706 connects various system components including system memory 720, (e.g., read only memory (ROM) 718 and random-access memory (RAM) 716), to processor 705. System architecture 700 can include a cache of high-speed memory connected directly with, in close proximity to, or integrated as part of the processor 705. System architecture 700 can copy data from memory 720 and/or the storage device 708 to the cache 702 for quick access by the processor 705. In this way, the cache can provide a performance boost that avoids processor 705 delays while waiting for data. These and other modules can control or be configured to control processor 705 to perform various actions. Other system memory 720 may be available for use as well. Memory 720 can include multiple different types of memory with different performance characteristics. Processor 705 can include any general-purpose processor and a hardware module or software module, such as module 1 (710), module 2 (712), and module 3 (714) stored in storage device 708, configured to control processor 705 as well as a special-purpose processor where software instructions are incorporated into the actual processor design. Processor 705 may essentially be a completely self-contained computing system, containing multiple cores or processors, a bus, memory controller, cache, etc. A multi-core processor may be symmetric or asymmetric.

To enable user interaction with the computing system architecture 700, input device 722 can represent any number of input mechanisms, such as surface or downhole sensors, microphone for speech, a touch-sensitive screen for gesture or graphical input, keyboard, mouse, motion input, and so forth. An output device 724 can also be one or more of a number of output mechanisms. In some instances, multimodal systems can enable a user to provide multiple types of input to communicate with the computing system architecture 700. Communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 716, read only memory (ROM) 718, and hybrids thereof.

Storage device 708 can include software modules 710, 712, 714 for controlling processor 705. Other hardware or software modules are contemplated. Storage device 708 can be connected to the system bus 706. In one aspect, a hardware module that performs a particular function can include the software component stored in a computer-readable medium in connection with the necessary hardware components, such as processor 705, bus 706, output device 724, and so forth, to carry out various functions of the disclosed technology.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

STATEMENTS OF THE DISCLOSURE

Statement 1: a computer-implemented method, include steps for: receiving wellbore data comprising one or more seismic measurements, processing the wellbore data to generate a seismic input image comprising visual representations of the one or more seismic measurements, and processing the seismic input image to identify a noise region in the seismic input image, wherein the noise region represents noise in the one or more corresponding seismic measurements.

Statement 2: the computer-implemented method of statement 1, wherein processing the image to identify the noise region further includes providing the seismic input image to a machine-learning model, and wherein the machine-learning model is configured to identify the noise region in the seismic input image using a bounded polygon.

Statement 3: the computer-implemented method of any of statements 1-2, wherein processing the image to identify the noise region further includes providing the seismic input image to a machine-learning model, and wherein the machine-learning model is configured to identify the noise region using time and wellbore depth coordinates.

Statement 4: the computer-implemented method of any of statements 1-3, wherein the seismic input image represents a spatial relationship between wellbore depth, and time, with respect to the one or more seismic measurements.

Statement 5: the computer-implemented method of any of statements 1-4, wherein processing the image to identify the noise region further includes providing the seismic input image to a machine-learning model, and wherein the machine-learning model comprises a convolutional neural network.

Statement 6: the computer-implemented method of any of statements 1-5, wherein processing the image to identify the noise region further includes: providing the seismic input image to a machine-learning model, and wherein the machine-learning model comprises a deep-learning network.

Statement 7: the computer-implemented method of any of statements 1-6, wherein the wellbore data comprises optical data that is communicated up a wellbore using one or more fiber optic channels.

Statement 8: a system including one or more processors; and a computer-readable medium comprising instructions stored therein, which when executed by the processors, cause the processors to perform operations including receiving wellbore data comprising one or more seismic measurements, processing the wellbore data to generate a seismic input image comprising visual representations of the one or more seismic measurements, and processing the seismic input image to identify a noise region in the seismic input image, wherein the noise region represents noise in the one or more corresponding seismic measurements.

Statement 9: the system of statement 8, wherein processing the image to identify the noise region further includes providing the seismic input image to a machine-learning model, and wherein the machine-learning model is configured to identify the noise region in the seismic input image using a bounded polygon.

Statement 10: the system of any of statements 8-9, wherein processing the image to identify the noise region further includes: providing the seismic input image to a machine-learning model, and wherein the machine-learning model is configured to identify the noise region using time and wellbore depth coordinates.

Statement 11: the system of any of statements 8-10, wherein the seismic input image represents a spatial relationship between wellbore depth, and time, with respect to the one or more seismic measurements.

Statement 12: the system of any of statements 8-11, wherein processing the image to identify the noise region further includes: providing the seismic input image to a machine-learning model, and wherein the machine-learning model comprises a convolutional neural network.

Statement 13: the system of any of statements 8-12, wherein processing the image to identify the noise region further includes: providing the seismic input image to a machine-learning model, and wherein the machine-learning model comprises a deep-learning network.

Statement 14: the system of any of statements 8-13, wherein the wellbore data comprises optical data that is communicated up a wellbore using one or more fiber optic channels.

Statement 15: a non-transitory computer-readable storage medium including instructions stored therein, which when executed by one or more processors, cause the processors to perform operations including: receiving wellbore data comprising one or more seismic measurements, processing the wellbore data to generate a seismic input image comprising visual representations of the one or more seismic measurements, and processing the seismic input image to identify a noise region in the seismic input image, wherein the noise region represents noise in the one or more corresponding seismic measurements.

Statement 16: the non-transitory computer-readable storage medium of statement 15, wherein processing the image to identify the noise region further includes: providing the seismic input image to a machine-learning model, and wherein the machine-learning model is configured to identify the noise region in the seismic input image using a bounded polygon.

Statement 17: the non-transitory computer-readable storage medium of any of statements 15-16, wherein processing the image to identify the noise region further includes: providing the seismic input image to a machine-learning model, and wherein the machine-learning model is configured to identify the noise region using time and wellbore depth coordinates.

Statement 18: the non-transitory computer-readable storage medium of any of statements 15-17, wherein the seismic input image represents a spatial relationship between wellbore depth, and time, with respect to the one or more seismic measurements.

Statement 19: the non-transitory computer-readable storage medium of any of statements 15-18, wherein processing the image to identify the noise region further includes: providing the seismic input image to a machine-learning model, and wherein the machine-learning model comprises a convolutional neural network.

Statement 20: the non-transitory computer-readable storage medium of any of statements 15-19, wherein processing the image to identify the noise region further comprises: providing the seismic input image to a machine-learning model, and wherein the machine-learning model comprises a deep-learning network.

What is claimed is:

1. A computer-implemented method, comprising:
   receiving wellbore data comprising one or more seismic measurements;
   generating a seismic input image based on the one or more seismic measurements;
   processing the seismic input image to identify zigzag noise in the seismic input image, wherein the zigzag noise represents noise in the one or more seismic measurements;
   applying a noise reduction technique to eliminate the zigzag noise in the seismic input image; and
   analyzing the seismic input image to determine formation properties.

2. The computer-implemented method of claim 1, wherein processing the seismic input image to identify the zigzag noise further comprises:
   providing the seismic input image to a machine-learning model, and
   wherein the machine-learning model is configured to identify the zigzag noise in the seismic input image using a bounded polygon.

3. The computer-implemented method of claim 1, wherein processing the seismic input image to identify the zigzag noise further comprises:
   providing the seismic input image to a machine-learning model, and
   wherein the machine-learning model is configured to identify the zigzag noise using time and wellbore depth coordinates.

4. The computer-implemented method of claim 1, wherein the seismic input image represents a spatial relationship between wellbore depth, and time, with respect to the one or more seismic measurements.

5. The computer-implemented method of claim 1, wherein processing the seismic input image to identify the zigzag noise further comprises:
   providing the seismic input image to a machine-learning model, and
   wherein the machine-learning model comprises a convolutional neural network.

6. The computer-implemented method of claim 1, wherein processing the seismic input image to identify the zigzag noise further comprises:
   providing the seismic input image to a machine-learning model, and
   wherein the machine-learning model comprises a deep-learning network.

7. The computer-implemented method of claim 1, wherein the wellbore data comprises optical data that is communicated up a wellbore using one or more fiber optic channels.

8. A system comprising:
   one or more processors; and
   a non-transitory computer-readable medium comprising instructions stored therein, which when executed by the one or more processors, cause the one or more processors to perform operations comprising:
   receiving wellbore data comprising one or more seismic measurements;
   generating a seismic input image based on the one or more seismic measurements;
   processing the seismic input image to identify zigzag noise in the seismic input image, wherein the zigzag noise represents noise in the one or more seismic measurements;
   applying a noise reduction technique to eliminate the zigzag noise in the seismic input image; and
   analyzing the seismic input image to determine formation properties.

9. The system of claim 8, wherein processing the seismic input image to identify the zigzag noise further comprises:
   providing the seismic input image to a machine-learning model, and
   wherein the machine-learning model is configured to identify the zigzag noise in the seismic input image using a bounded polygon.

10. The system of claim 8, wherein processing the seismic input image to identify the zigzag noise further comprises:
    providing the seismic input image to a machine-learning model, and wherein the machine-learning model is configured to identify the zigzag noise using time and wellbore depth coordinates.

11. The system of claim 8, wherein the seismic input image represents a spatial relationship between wellbore depth, and time, with respect to the one or more seismic measurements.

12. The system of claim 8, wherein processing the seismic input image to identify the zigzag noise further comprises:
 providing the seismic input image to a machine-learning model, and
 wherein the machine-learning model comprises a convolutional neural network.

13. The system of claim 8, wherein processing the seismic input image to identify the zigzag noise further comprises:
 providing the seismic input image to a machine-learning model, and
 wherein the machine-learning model comprises a deep-learning network.

14. The system of claim 8, wherein the wellbore data comprises optical data that is communicated up a wellbore using one or more fiber optic channels.

15. A non-transitory computer-readable storage medium comprising instructions stored therein, which when executed by one or more processors, cause the one or more processors to perform operations comprising:
 receiving wellbore data comprising one or more seismic measurements;
 generating a seismic input image based on the one or more seismic measurements;
 processing the seismic input image to identify zigzag noise in the seismic input image, wherein the zigzag noise represents noise in the one or more seismic measurements;
 applying a noise reduction technique to eliminate the zigzag noise in the seismic input image; and
 analyzing the seismic input image to determine formation properties.

16. The non-transitory computer-readable storage medium of claim 15, wherein processing the seismic input image to identify the zigzag noise further comprises:
 providing the seismic input image to a machine-learning model, and
 wherein the machine-learning model is configured to identify the zigzag noise in the seismic input image using a bounded polygon.

17. The non-transitory computer-readable storage medium of claim 15, wherein processing the seismic input image to identify the zigzag noise further comprises:
 providing the seismic input image to a machine-learning model, and
 wherein the machine-learning model is configured to identify the zigzag noise using time and wellbore depth coordinates.

18. The non-transitory computer-readable storage medium of claim 15, wherein the seismic input image represents a spatial relationship between wellbore depth, and time, with respect to the one or more seismic measurements.

19. The non-transitory computer-readable storage medium of claim 15, wherein processing the seismic input image to identify the zigzag noise further comprises:
 providing the seismic input image to a machine-learning model, and
 wherein the machine-learning model comprises a convolutional neural network.

20. The non-transitory computer-readable storage medium of claim 15, wherein processing the seismic input image to identify the zigzag noise further comprises:
 providing the seismic input image to a machine-learning model, and
 wherein the machine-learning model comprises a deep-learning network.

* * * * *